United States Patent [19]

Owades

[11] Patent Number: 4,882,186

[45] Date of Patent: Nov. 21, 1989

[54] PROCESS FOR PRODUCING A MALT BEVERAGE HAVING IMPROVED FOAMING PROPERTIES AND PRODUCT PRODUCED THEREFROM

[76] Inventor: Joseph L. Owades, 2164 Hyde St., San Francisco, Calif. 94109

[21] Appl. No.: 301,619

[22] Filed: Jan. 25, 1989

[51] Int. Cl.$^4$ ................................................ C12C 5/02
[52] U.S. Cl. .................................... 426/329; 426/16; 426/330.4; 426/592
[58] Field of Search .................. 426/11, 12, 16, 330.4, 426/592, 329

[56] References Cited

U.S. PATENT DOCUMENTS

| | | | |
|---|---|---|---|
| 3,055,757 | 9/1962 | Segel | 426/12 |
| 3,061,439 | 10/1962 | Stone | 426/12 |
| 3,512,988 | 5/1970 | Yomo | 426/12 |
| 4,729,900 | 3/1988 | Clare et al. | 426/330.4 |

FOREIGN PATENT DOCUMENTS

| | | | |
|---|---|---|---|
| 0762364 | 8/1971 | France | 426/16 |
| 0685689 | 9/1979 | U.S.S.R. | 426/16 |
| 1158572 | 5/1985 | U.S.S.R. | 426/16 |
| 1178759 | 9/1985 | U.S.S.R. | 426/16 |

*Primary Examiner*—Marianne Cintins
*Attorney, Agent, or Firm*—Hayes, Soloway, Hennessey & Hage

[57] ABSTRACT

The foaming properties of a brewed malt beverage are improved by adding to the beverage during the normal brewing process a measured quantity of ginseng.

9 Claims, No Drawings

PROCESS FOR PRODUCING A MALT BEVERAGE HAVING IMPROVED FOAMING PROPERTIES AND PRODUCT PRODUCED THEREFROM

FIELD OF THE INVENTION

The present invention relates generally to the production of malt beverages, and more particularly to the production of malt beverages having improved foaming properties. The invention has particular utility in the production of beer and will be described in connection with such utility, although the invention also may be advantageously used in the production of other malt beverages such as malt flavored beverages.

DESCRIPTION OF THE INVENTION

In the production of beer, yeast is used to ferment into ethyl alcohol a substrate made of a mixture of fermentable carbohydrates so called "wort carbohydrates." The wort carbohydrates involved which can be fermented by Brewers' yeast are normally maltose, glucose, maltotriose and traces of sucrose and fructose. They are obtained by allowing malt enzymes (alpha and beta maylase) to transform starch molecules from malt and other adjuncts into the fermentable sugars outlined above. This is done during the so-called mashing operation.

Conventional mashing involves mixing together of malt and cereal adjuncts in hot water, followed by a series of heating and resting cycles. Substances which are solubilized in the hot water are collectively called the extract. Following mashing, the soluble materials are extracted in a lauter tub, leaving behind the spent grain. A clear liquid (wort) obtained by the extraction may then be transferred to a brew kettle and boiled for a period of time (kettle boiled) which inactivates the malt enzymes. Wort compositions vary depending on the raw materials and mash cycle employed.

A typical wort used in brewing may comprise the mixed extract of a barley malt mash and a cereal adjuncts mash typically of corn grits or rice. Such mixed extract may be obtained by treating a kiln dried barley malt with warm water, at about 50° C., in one vessel, the so-called "mash tub", and boiling the cereal adjuncts, (e.g. corn grits or rice) in another vessel, the so-called "cooker," and then adding the boiling contents of the cooker to the warm malt suspension in the mash tub. This serves to raise the temperature of the mash tub contents to about 57°-67° C. During the rise from 50° C., to about 67° C., and starting at around 63° C., the enzymes in the malt and in particular beta-amylase which is most active between 60° and 70° C., partially degrade the starches in both the malt itself and in the corn grits or rice to form simple fermentation sugars, primarily glucose, fructose and maltose. These simple sugars are fairly sweet tasting, and also are fermentable by Brewers' yeast to alcohol and carbon dioxide.

The combined mash is then filtered in a lauter tub, mash filter or other means and the resulting wort boiled with hops, filtered, cooled and fermented with yeast, and carbonated to produce a beer or ale.

Carbonated malt beverages produce a more or less long-lasting foam when poured into a drinking glass. This foam has always been considered a desirable attribute in such beverages. Carbonation or foam enhances the flavor and mouth feel and adds to the consumer's perception of freshness. A flat beer looks and tastes stale. Prior to the present invention, the only agents known to improve the foaming properties have been gums such as acacia or align derivatives, or a metal salt, such as ferrous ammonium sulfate. However, such agents may adversely affect taste and/or increase turbidity, haze or cloudiness of the resulting beverage product and thus are not entirely satisfactory.

OBJECT OF THE INVENTION

It is thus a primary object of the present invention to provide a new and improved process for improving the foaming properties of a malt beverage. Another object of the present invention is to provide a novel and improved method for increasing the foam life of a malt beverage. A specific object of the present invention is to provide a malt beverage which is characterized by improved foaming characteristics in particular, improved foam life.

The invention accordingly comprises the processes involving the several steps and relation of one or more such steps with respect to each other, and the materials and products possessing the features, properties and relations of elements, all of which are exemplified in the detailed description, and the scope of the application, which will be indicated in the claims.

BRIEF SUMMARY OF THE INVENTION

Generally, in accordance with the present invention, I have found that the addition of ginseng during the normal brewing process produces a malt beverage of improved foaming properties.

DETAILED DESCRIPTION OF THE INVENTION

Ginseng, which is derived from the root of Panax Ginseng, comprises a mixture of sugars, sterols, oleanolic acid, and a series of saponin or triterpenoid glycosides including, in particular *P. quinquefolium* and *P. pseudoginseng* which are generally considered to be biologically active.

The ginseng may be added to the kettle and boiled with the hops. Alternatively, the ginseng may be added later in the brewing process as a water extract, typically as a warm or hot water extract.

The foaming improvement appears to be dependent on the quantity of ginseng added. Generally, ginseng may be added in an amount in the range of about 0.01 to about 0.10 or more lb. of ginseng per bbl. of malt beverage. Addition of less than about 0.01 lb. of ginseng per bbl. of malt beverage generally results in only marginal improvement, at best, in foaming properties, while addition of more than about 0.10 or more lb. of ginseng per bbl. of malt beverage appears to result in little additional improvement in foaming properties. The reason why the addition of ginseng during the brewing process improves foaming is not known. However, it is believed that at least some soluble components of ginseng carried over into the finished beverage product provide the desired improvement in foaming properties.

The resulting malt beverage has superior foaming properties over a similar beverage made without the addition of ginseng, and none of the disadvantages of adverse taste, turbidity, etc. common to prior art techniques for improving foaming properties.

The present invention will be further described in the following working examples.

The following examples, illustrative of the present invention, employ a conventional brew house having a mash tub and a cereal cooker or boiler vessel. The basic procedure was to suspend dried, ground barley malt in water, heat the resulting suspension to about 50° C. for a period of time. In Example I, the cereal adjuncts, i.e. corn grits, which have been boiled in a separate cereal cooker or boiler vessel, are added to the malt slurry. The combined mash is heated for a period of time and then transferred to a filtering vessel or lauter tub. The clear liquid which drains from the mash, and the hot water used to wash the adhering liquid from the grains are run into a kettle and boiled. The hops and ginseng are added during the boiling period. The liquid is again strained, cooled and treated with yeast and fermented. In Example II the barley malt is ground in the mill and mashed with water at about 51° C. The temperature is raised and the malt slurry is transferred to a mash filter. The filtered liquid is run into a kettle, and cereal adjuncts in the form of corn syrup added. The combined mash is heated for a period of time and then transferred to a filtering vessel or lauter tub where the liquid is strained, cooled and allowed to ferment. The fermented liquid is filtered, and treated with a hot water extract of ginseng.

EXAMPLE I 1,500 pounds of corn grits were added to 30 barrels of water, and the resulting mixture heated to boiling, with stirring, for 30 minutes in a cereal cooker.

Concurrently, 2,500 pounds of ground barley malt were added to 30 barrels of water, and heated to 50° C., with stirring, in a mash tub. The resulting malt mash was held at 50° C. for 15 minutes, and the contents of the cereal cooker were then rapidly pumped over into the mash tub. The combined mash was held at 63° C. for thirty minutes, and then heated to 75° C. and transferred to a lauter tub. A clear liquid, drained from the mash, and hot water used to wash the adhering liquid from the grains are run into a kettle and boiled for 60 minutes. Thirty pounds of hops and two pounds of ginseng are added during the boiling period.

The resulting liquid is again strained, cooled to about 10° C., and transferred to a fermentation tank to which was added one hundred pounds of brewers' yeast. The resulting mixture was allowed to ferment for seven days. After letting the yeast settle out, and filtering, the resulting filtrate beer was bottled.

In a time and pour test, the ginseng-treated beer foam lasted six minutes, while beer produced under identical conditions, but without the addition of ginseng, foam lasted only four and one half minutes.

EXAMPLE II 2,500 pounds of ground barley malt were added to 30 barrels of water, and heated to 51° C. The temperature of the mash was raised to 75° C., and the mash transferred to a mash filter. The filtered liquid was run into a kettle and 140 gallons of corn syrup added. The resulting combined mash was then boiled for 60 minutes. The resulting liquid was strained, cooled to about 11° C., and transferred to a fermentation tank to which was added 90 pounds of brewers' yeast. The resulting mixture was allowed to ferment for seven days. The fermented liquid was then filtered, and treated with hot water extract of three pounds of ginseng. The treated liquid was held at 1° C. for 24 hours, and the liquid was then filtered, packaged and cooled.

In a pour test, the ginseng-treated malt beverage foam lasted 5½ minutes while malt beverage produced under identical conditions, but without the addition of ginseng, lasted only 4 minutes.

Certain changes may be made without departing from the scope of the invention herein involved. It is therefore intended that all matter contained in the above description shall be interpreted as illustrative and not in a limiting sense.

I claim:

1. A method of improving the foaming properties of a brewed malt beverage during brewing which comprises adding to the malt beverage prior to or following fermentation about 0.01 to about 0.1 lb. of ginseng per bbl. of malt beverage.

2. A method according to claim 1 wherein said ginseng is added as a water extract.

3. A method according to claim 1 wherein said brewing comprises boiling with hops, wherein said ginseng is boiled with the hops.

4. In a method of producing a malt beverage wherein a malt mash is blended with cereal adjuncts and boiled to form a wort, the wort is pitched with yeast, and is fermented, the improvement which comprises adding during said boiling about 0.01 to about 0.1 lb. of ginseng per bbl. of malt beverage.

5. In a method of producing a malt beverage, wherein a malt mash and cereal adjuncts are combined in a kettle and boiled for a period of time, and the resulting liquid pitched with brewer's yeast and allowed to ferment for a period of time to produce a fermented liquid, the improvement which comprises treating the fermented liquid with about 0.01 to about 0.1 lb. of ginseng per bbl. of malt beverage.

6. In a method according to claim 5, the improvement wherein said ginseng is employed as a water extract.

7. In a method according to claim 5, the improvement wherein said cereal adjuncts comprise corn syrup.

8. A brewed malt beverage having improved foaming properties comprising sufficient quantities of soluble components of ginseng to produce improved foaming.

9. A beverage according to claim 8 wherein said ginseng is in the form of a water extract.

* * * * *